United States Patent [19]
Alfredsson et al.

[11] Patent Number: 4,741,605
[45] Date of Patent: May 3, 1988

[54] MULTIFOCAL OBJECTIVE

[75] Inventors: Hans Alfredsson; Bo Möller; Erik Ingelstam; Per-Olof Ohlsson, all of Stockholm; Georg Vogl, Saltsjöbaden, all of Sweden

[73] Assignees: AB Svensk Filmindustri; Svenska Ord AB, both of Stockholm, Sweden

[21] Appl. No.: 680,332

[22] PCT Filed: Mar. 19, 1984

[86] PCT No.: PCT/SE84/00096
§ 371 Date: Nov. 29, 1984
§ 102(e) Date: Nov. 29, 1984

[87] PCT Pub. No.: WO84/03952
PCT Pub. Date: Oct. 11, 1984

[30] Foreign Application Priority Data
Mar. 29, 1983 [SE] Sweden .................. 8301744

[51] Int. Cl.$^4$ .................. G02B 15/02; G02B 13/20
[52] U.S. Cl. .................. 350/422; 350/431; 350/437; 350/449
[58] Field of Search .......... 350/422, 431, 437, 449, 350/415

[56] References Cited
U.S. PATENT DOCUMENTS
2,546,996 4/1951 Garutso .................. 350/464 X
3,388,650 6/1968 Westphalen .................. 350/422
3,588,227 6/1971 Yamamoto et al. .................. 350/437

FOREIGN PATENT DOCUMENTS
416246 7/1925 Fed. Rep. of Germany .
833904 11/1938 France .
115876 2/1946 Sweden .
378559 7/1964 Switzerland .
335696 10/1930 United Kingdom .

Primary Examiner—John K. Corbin
Assistant Examiner—Scott J. Sugarman
Attorney, Agent, or Firm—Pollock Vande Sande & Priddy

[57] ABSTRACT

The present invention relates to an image-forming objective which is capable of forming sharp images of objects at at least two different distances from the objective, there being arranged at one focal plane of the objective a corrective element divided into at least two fields in which the refractive power differs between them.

8 Claims, 1 Drawing Sheet

MULTIFOCAL OBJECTIVE

DESCRIPTION OF THE PRIOR ART

An objective with these properties is known from U.S. Pat. No. 3,588,227 and is designed to serve as a microscope objective. Two objects in front of the objective are imaged sharply in the focal plane and with the same magnification. According to the principle of the known design, at the image-side focus of the objective, an optical element is arranged which in one half of this focal plane functions as a positive lens, acting to focus the closest object on the focal plane, and in the other half thereof functions as a plane-parallel disc without any net refraction (thus only the refractive power of the objective itself acts on beams in this half) so that the beams from the more distant object are not refracted as much and, because of a choice of suitable dimensions, are focused in the very same focal plane.

SUMMARY OF THE INVENTION

One object of the present invention is to produce a photographic objective, which is of particular use in moving picture and TV-cameras, making it possible in a single scene to provide sharp images of two objects at different distances, i.e., each with its own depth of field. The image thus combined should have a natural appearance, and if two different optical systems are used, it is particularly important that the unsharp image of one object made by the system which makes a sharp image of the other object, disrupt the sharp image of the other system as little as possible. Otherwise, the unsharp image could create a visible ghost image. If, however, the fuzzy image is of the same size as and is superimposed on a sharp image, the image will be perceived as sharp.

It is previously known to achieve this purpose by using two different objectives and mirror devices. Major mechanical stability problems are encountered in this case, however. Furthermore, it is difficult to make two images coincide exactly, one with a sharp object A and an unsharp object B and the other with an unsharp object A and a sharp object B. The two images of A, one sharp and one unsharp, must be superimposed on each other even if they do not lie in the center of the image surface, which means that the objective must provide the same magnification. One purpose of the invention is to achieve such a consolidation of images, and to do this with a single objective, suited to photography, cinematography, TV, etc.

The objective revealed by the above-mentioned patent specification does not constitute a solution to the problem according to the invention. Two objects A and B at different distances will each be sharply imaged in individual halves by the known objective and be of the same size, but at the same time the unsharp images will be of different sizes, and therefore an unsharp and different-sized image of A, for example, will be superimposed on the sharp image of A. This will have a very disturbing effect in a cinematographic picture, for example.

In other designs, relating to photographic objectives, lenses divided into zones are used, similar to Fresnel lenses, for instance, and are revealed in, for example, No. GB-A-335 696 and U.S. Pat. Nos. 2,546,996 and 2,651,237. While the zones do provide sharp images of objects at different distances, the problem of the unequal magnifications of the unsharp ghost images of the different objects has not been addressed and therefore the purpose of the present invention has not been achieved. It is true that U.S. Pat. No. 2,651,238 discusses this problem, but the solution there indicated was that the ghost images be so greatly out of focus that they do not disturb the sharp images, which can be difficult to achieve except with very small individual depths of field and with a large aperture.

The above-mentioned purpose and other purposes and advantages are achieved according to the invention, which has an image-forming objective of the type described by way of introduction, in which the corrective element is arranged in the objective focal plane closest to the object. The unsharp image of an object, which is also giving a sharp image, will be of the same size as the sharp image. It is true that the contrast of the composite image will be poorer than the contrast in a normal image, but the effect thereof will not be disturbing and can even provide an artistically pleasing soft focus, which is otherwise achieved with special diffusion discs. This effect can be enhanced further by providing one or even both of the fields in the corrective element with a diffusion disc or the like.

The different fields in the corrective element can, if required, be placed anywhere in the front focal plane of the objective. It is particularly advantageous, however, to arrange the fields symmetrically in relation to the optical axis. In a bifocal design, for example, it is advisable to have the boundary between the fields be a diameter which intersects the optical axis. For more than two objects and fields, the fields can be made in the form of circular sectors with the points on the optical axis. This has the advantage that a diaphragm placed closely thereto will stop down all of the images the same amount. Otherwise, other field distributions can provide a number of special effects. For example, with an annular zone the associated image can be made soft and diffused by stopping down, in many cases to interesting effects. It can be worth mentioning that one of the fields in the corrective element can suitably be open, and in a simple and practical embodiment of a bifocal objective, the corrective element can consist of a thin lens system which is semicircular, and can be considered to be a half fore-lens.

Several such corrective systems can be mounted on an arrangement in front of the objective, so that they can be easily interchanged, e.g., in a revolver mounting. If "half fore-lenses" are used, the focusing for one image will be done in the usual manner (as a rule by moving the objective relative to the film plane), while the focus of the other image is obtained by suitable selection of the fore-lens. Instead of a simple thin system, it is also possible to set in a system with variable refraction, more or less along the lines of a zoom lens. The objective behind it can of course also be a zoom lens, and this may require a certain calculated effort, which does, however, lie within the capacity of the optical designer.

BRIEF DESCRIPTION OF THE DRAWINGS

The invention is clearly revealed in the drawings,

FIG. 1 of which shows schematically an objective according to the invention, while

DESCRIPTION OF THE PREFERRED EMBODIMENT

Figure 1:
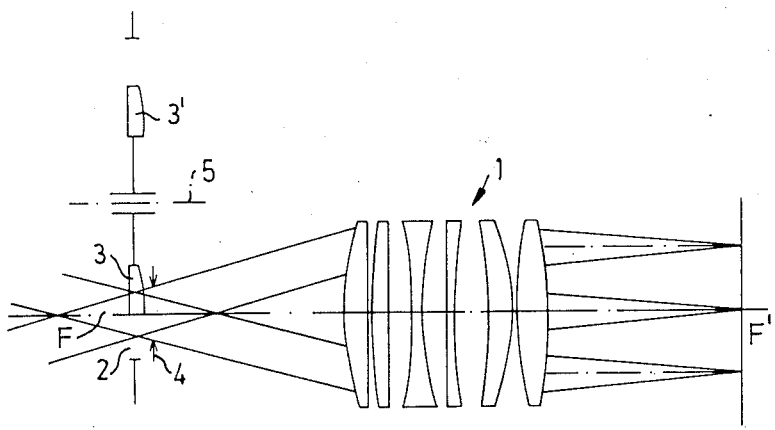

The composite objective shown in FIG. 1 comprises a cinematographic objective 1 with a focal length of 50 mm represented in approximately natural size. The foci are located at F and F′ and a film plane has been drawn in at the rear focal plane. In the front focal plane there is a "half" lens 3 which extends as far as the optical axis, and an iris 4.

Since it is well known how objectives are designed (see for example Conrady, Applied Optics and Optical Design, parts I and II, New York 1957, Dover), it is unnecessary to describe the seven-lens objective shown. As regards the element 3, it is drawn as a single, thin lens, and such a design is usually satisfactory, especially if the diopter number does not need to be high. An achromatization may be advisable, although this should be determined in relation to the actual lack of sharpness already there due to the unsharp image superimposed on the sharp image.

With a setting for one of the objects, as in the figure, at infinity, the focal length for the lens element 3 should be equal to the distance to the other object, with the lens 3 forming a virtual image at infinity.

The functioning of the system may be clearer by applying Gullstrand's formula for refractive power in two combined lens systems:

$$D = D_1 + D_2 - \delta \cdot D_1 \cdot D_2$$

where $D_1$ and $D_2$ are the diopter number ($m^{-1}$) of the systems and $\delta$ is the distance between the systems (or their principal-facing planes in Gauss' approximation). If, as here, the lens element 3 (diopter number $D_2$) is at the focus of the composite objective (diopter number $D_1$), the result will be $D = D_1$.

Figure 2:
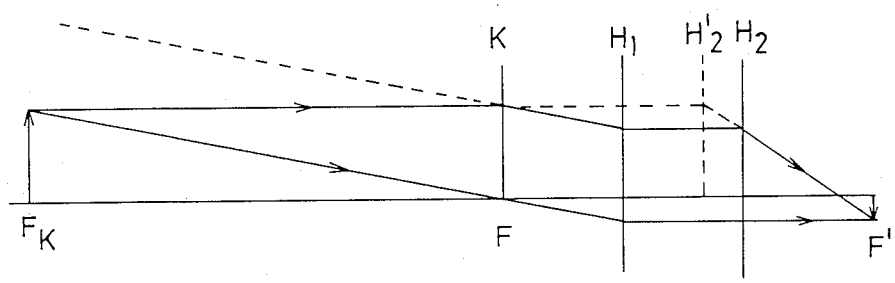
FIG. 2 shows a schematic beam path.

Thus the corrective element does not effect the focal length of the system. FIG. 2 shows a schematic optical path, the main objective being represented by the focal points F and F′ and the principal planes $H_1$ and $H_2$. The corrective element K is shown as a thin lens with focal point $F_K$. Two rays are shown for an object at $F_K$, and it can be seen therefrom that the front principal plane of the system coincides with that of the main objective, while the rear principal plane of the system will be displaced towards the object just enough so that the object at $F_K$ will be in focus at F′.

When using a thin lens 3 in the form of a half lens, its edge should be well blackened to avoid light scattering. Experience has shown that the corrective element must also be well centered in relation to the optical axis. Otherwise the sharp and the unsharp image will not coincide but will be somewhat laterally displaced (net wedge effect). In a cinematographic objective with a movable or interchangeable corrective element, for purely practical reasons there must be a reproducible and exact centering, of the order of a few hundredths of a millimeter (for 50 mm focal length).

In order to avoid difficult vignetting problems, an objective should be used which is computed so that its entrance pupil is located at the forward focus (socalled telecentric objective). The diaphragm 4 will then also be at the actual entrance pupil of the objective.

FIG. 1 also shows schematically a revolver mechanism with an axis of rotation 5 and two corrective elements 3 and 3′. Several different corrective elements can suitably be mounted in holes in the revolver disc, leaving one hole empty, so that the objective 1 can also be used as an ordinary objective. As already pointed out, this revolver mechanism should be made with high precision and the corrective elements be well centered; this does not present any insurmountable technical problems, but should be kept in mind during its design.

The invention provides a photographic objective which solves the problem of imaging sharply in a single scene objects located at different distances from the camera, each of the objects having its own depth of field. To date, such imaging, has in practice had to be done by stopping way down. As an example of what can be achieved with an objective with F=50 mm, it is possible with a stop-number of 4 (with a resolution requirement of 0.03 mm) to obtain the two depths of field 1.8–2.2 m and 6.7–19 m (settings 2 m and 10 m). If one stops down to f-stop 14, the combined depth of field will then be 1.5 m–∞. A comparable depth of field achieved with conventional stopping-down would require f-stop 28.

In addition to the great increase in usable depth of field, one should also mention the previously unknown, purely artistic unique effects which can be obtained through the invention, whereby the focus can be concentrated to selected dramatic areas of a filmed scene. In still-photography as well, the invention can provide a new means for achieving new artistic effects free of the limitations previously, considered unavoidable and dictated by the technology. Ideally, pictures should be true to nature, and the lack of deep focus, which the human eye unconsciously compensates for by continually changing focus, must create an unnatural impression, which can be largely eliminated by the invention.

We claim:

1. A lens system having an image-forming objective which is capable of forming sharp images of objects at at least two different distances from said objective, a corrective element (3) divided into at least two fields of differing refractive power being arranged at one focal plane (F) of the objective, said corrective element (3) being arranged in the objective focal plane (F) which is located closest to a said object, and an entrance pupil of said objective being located at its forward focus in the direction of said object.

2. A lens system objective according to claim 1, wherein said fields are symmetrically arranged in relation to an optical axis of said objective.

3. A lens system objective according to claim 1 or 2, including an aperture device at the forward, object-directed focus of said objective.

4. A lens system according to claim 1 or 2, wherein said corrective element consists of a single or composite lens, which is halved along a diameter, which intersects said optical axis of said objective.

5. A lens system according to claim 3, wherein said corrective element has a variable focal length.

6. A lens system according to claim 1, wherein said corrective element is removably mounted.

7. A lens system according to claim 6, comprising a plurality of corrective elements with different focal lengths mounted in openings in a revolver mechanism.

8. A lens system according to claim 1, wherein one of said fields is provided with a means for reducing sharpness to achieve a so-called soft focus effect.

* * * * *